United States Patent [19]

Nakamura et al.

[11] Patent Number: 5,146,445
[45] Date of Patent: Sep. 8, 1992

[54] OPTICAL HEAD WITH TRACKING ERROR DETECTING SYSTEM

[75] Inventors: Tohru Nakamura; Hideki Aikoh; Masayuki Shinoda; Noboru Kikuchi, all of Osaka, Japan

[73] Assignee: Matsushita Electric Industrial Co., Ltd., Osaka, Japan

[21] Appl. No.: 559,912

[22] Filed: Jul. 30, 1990

[30] Foreign Application Priority Data

Aug. 4, 1989 [JP] Japan .................. 1-203282

[51] Int. Cl.⁵ .............................. G11B 7/13
[52] U.S. Cl. ................ 369/44.41; 369/44.42; 369/44.11
[58] Field of Search .......... 369/44.41, 44.42; 250/201.4, 201.5

[56] References Cited

U.S. PATENT DOCUMENTS

| | | | |
|---|---|---|---|
| 4,051,527 | 9/1977 | Braat | 358/128 |
| 4,926,036 | 5/1990 | Maeda | 369/44.42 |
| 4,998,235 | 3/1991 | Ishibashi et al. | 369/44.41 |

FOREIGN PATENT DOCUMENTS

| | | |
|---|---|---|
| 55-101142 | 8/1980 | Japan . |
| 57-183639 | 11/1982 | Japan . |
| 60-214429 | 10/1985 | Japan . |
| 2059664 | 4/1981 | United Kingdom . |
| 2196115 | 4/1988 | United Kingdom . |

OTHER PUBLICATIONS

Patent Abstracts of Japan, vol. 10, No. 147(P-460)(2204) May 29, 1986, & JP-A-60 263344 (Yokokawa Hokushin Denki K.K.) Dec. 26, 1985, * the whole abstract *.
Patent Abstracts of Japan, vol. 12, No. 451(P-791)(3298) Nov. 28, 1988, & JP-A-63 175233 (Canon Inc) Jul. 19, 1988, * the whole abstract *.

*Primary Examiner*—Roy N. Envall, Jr.
*Assistant Examiner*—Paul W. Huber
*Attorney, Agent, or Firm*—Lowe, Price, LeBlanc & Becker

[57] ABSTRACT

An optical head equipped with a tracking error detector to obtain a tracking error signal for tracking servo. The detector includes a photodetector having a light-detecting region on which a light spot with a predetermined diameter is formed by a reflected light beam from a recording medium. The region is divided by a first division line into two which are further divided by second and third division lines so as to form first to fourth subregions, the first and second subregions being adjacent to each other with the first division line being interposed therebetween, the third subregion being adjacent to the first subregion, and the fourth subregion being adjacent to the second subregion. The separation between the second and third division lines is determined so that the sum of the light receiving quantities of the first and fourth subregions is substantially equal to the sum of the light receiving quantities of the second and third subregions when the objective lens is shifted from its neutral position. Electric signals produced in correspondance with the light receiving quantities are supplied to a differential amplifier to take a difference between a sum signal of the signals due to the first and fourth subregions and a sum signal of the signals due to the second and third subregions.

4 Claims, 6 Drawing Sheets

OPTICAL HEAD WITH TRACKING ERROR DETECTING SYSTEM

BACKGROUND OF THE INVENTION

The present invention relates to optical heads for optically recording, reproducing and erasing information on and from an information recording medium such as an optical disc, and more particularly to such an optical head equipped with a tracking error detecting system to accurately keeping the position of an objective lens of the optical head with respect to a track on the information recording medium.

Various types of tracking error detecting systems for optical heads have been proposed hitherto. One known arrangement will briefly be described hereinbelow with reference to FIGS. 1 and 2A to 2C. In FIG. 1, a light beam emitted from a light source 1 is first reflected by a half-mirror (beam splitter) 2a and then focused on a disc 4 through an objective lens 3. On a surface of the disc 4 is formed an information track, not shown, which is constructed as a spirally continuous groove. The reflection light beam from the disc 4 passes through the same half-mirror 2a before being reflected by another half-mirror 2b so as to be incident on a detecting means 15 for focus error signal detection and information signal detection. The detecting means 15 is coupled to an actuator 3a whereby the objective lens 3 is moved in directions Y in accordance with the focus error signal detection for the focus servo operation. On the other hand, the light beam passing through the half-mirror 2b reaches a two-divided photodetector 5 to form a light spot 7 thereon. The two-division photodetector 5 having thereon a division line 5a to divide the light-detecting region into two light-detecting subregions, the output electric signals of which are fed to a differential amplifier 6 so as to detect the difference between the output signals to obtain a tracking error signal. This technique is so-called Push-pull method and widely used in the optical recording and reproducing art. The tracking error signal is supplied through a servo amplifier 16 to the actuator 3a whereby the objective lens 3 is moved in the positive (+) and negative (−) directions X for tracking servo operation.

Although satisfactory for tracking error signal detection with a simple structure, the above-described tracking error detecting system has the following disadvantages.

FIGS. 2A to 2C are illustrations for describing the tracking error signals in connection with the position of the light spot 7 on the two-division photodetector 5. As illustrated in FIG. 2A, the light spot 2 is formed thereon so as to be symmetrical relative to the division line 5a in cases where the objective lens 3 takes a neutral position in the direction X. If the target voltage in the tracking servo actuating condition is zero, the tracking error signal obtained when the optical disc 4 is rotating and only the focus servo is actuated symmetrically varies with respect to the zero voltage in accordance with the radial runout of the information track on the recording medium 4. FIG. 2B shows the case that the position of the light spot 7 is changed in response to the objective lens 3 being moved in the positive direction X (to the right side). In this case, the light spot 7 on the two-division photodetector 5 is shifted so as not to be symmetrical with respect to the division line 5a. Thus, the tracking error signal obtainable does not vary symmetrically relative to the zero voltage but is superimposed with an offset voltage +V. On the other hand, in the case illustrated in FIG. 2C, the light spot 7 is shifted to the left side in response to the objective lens 3 being moved in the negative direction X, whereby the tracking error signal obtainable is superimposed with an offset voltage −V.

In FIG. 2B, if two times of the amplitude of the tracking error signal is taken to be S, when the value V/S exceeds 10%, the control performance of the tracking servo generally deteriorates. When the moving amount of the objective lens 3 in the directions X reaches about 50 μm, in the case of the conventional push-pull system, the value V/S exceeds 10%.

In the case of performing a high-speed search of the target track, it is general that the tracking servo enters into the actuating state after the start of the high-speed operation of the optical head. Thus, the objective lens 3 is shifted from the nuetral position in the directions X due to the acceleration or the like occuring in response to the movement of the optical head and the light spot 7 results in the condition as illustrated in FIG. 2B or 2C. Under these conditions, the tracking servo tends to enter into an undesirable actuating state. Even if the tracking servo fortunately enters into a desirable state, the follow-up performance thereof extremely deteriorates.

One possible solution for the above-described problems is disclosed in the Japanese Patent Provisional Publication No. 60-214429, the technique of which involves including a photodetector whose light-detecting region is divided into four or more sub-regions so as to obtain a tracking error signal on the basis of the output signals of the four or more light-detecting sub-regions. Although according to this system the offset of the tracking error signal produced due to the movement of the objective lens in the tracking direction can be reduced, there is a problem in that a great number of amplifiers are required for the processing.

SUMMARY OF THE INVENTION

It is therefore an object of the present invention to provide a tracking error detection system for an optical head which is capable of being simply constructed and considerably reducing the offset of the tracking error signal.

With this object and other features which will become apparent as the description proceeds, according to the present invention, an optical head for optically reproducing information from a recording medium, comprising: light source means for emitting a light beam; objective lens means for converging the light beam from the light source means so as to apply a microscopic light spot to an information track formed on the recording medium; actuator means for moving the objective lens means in predetermined focusing and tracking directions in accordance with focusing and tracking control signals; focus error signal detecting means responsive to a light beam reflected from the recording medium so as to obtain a focus error signal which is in turn supplied as the focusing control signal to the actuator means so that the objective lens means is moved in the focusing directions, which is substantially parallel to the optical axis directions of objective lens means, in accordance with the focusing control signal so as to perform a focus servo; and tracking error detecting means responsive to a light beam reflected from the recording medium so as to obtain a tracking error signal which is in turn supplied as the tracking control signal to the actuator means so that the objective lens means is moved in the tracking directions, which is substantially perpendicular to the optical axis directions of the objective lens means, in accordance with the tracking control signal so as to perform a tracking servo, the tracking error detecting means including: photodetector means having a light-detecting region on which a light spot with a predetermined diameter is formed by the reflected light beam from the recording medium and which is divided by a first division line, which is provided in correspondance with the information track on the recording medium, into two which are respectively divided by second and third division lines, substantially parallel to the first division line, so as to form first to fourth light-detecting subregions, the first and second light-detecting subregions being adjacent to each other with the first division line being interposed therebetween, and the third light-detecting subregion being adjacent to the first light-detecting subregion with the second division line being interposed therebetween and the fourth light-detecting subregion being adjacent to the second light-detecting subregion with the third division line being interposed therebetween, the first and second light-detecting subregions being arranged so that their light receiving quantities are equal to each other when the objective lens means enters into the focus servo state and is at a neutral position in its movable range under the tracking servo, and the separation between the second and third division lines being determined so that the sum of the light receiving quantities of the first and fourth light-detecting subregions is substantially equal to the sum of the light receiving quantities of the second and third light-detecting subregions when the objective lens means is shifted from the neutral position; and differential amplifier means responsive to electric signal produced by the first to fourth light-detecting subregions for calculating a difference between a sum signal of the electric signals due to the first and fourth light-detecting subregions and a sum signal of the electric signals due to the second and third light-detecting subregions, the differential amplifier means supplying said actuator means with the difference signal as the tracking control signal so that said objective lens means is moved in the tracking directions in accordance with the difference signal.

Preferably, the photodetector means is arranged such that, when the diameter of the light spot formed thereon is D and the separation between said second and third division lines is W, W/D is between 0.7 and 0.9, and the tracking error detecting means includes an optical device whereby the reflected light beam from the recording medium is converged so that a light spot with the predetermined diameter is formed on the light-detecting region of the photodetector.

In accordance with the present invention, there is further provided an optical head for optically reproducing information from a recording medium, the optical head comprising: light source means for emitting a light beam; objective lens means for converging the light beam from said light source means so as to apply a microscopic light spot to an information track formed on said recording medium; actuator means for moving said objective lens means in predetermined focusing and tracking directions in accordance with focusing and tracking control signals; focus error signal detecting means responsive to a light beam reflected from said recording medium so as to obtain a focus error signal which is in turn supplied as said focusing control signal to said actuator means so that said objective lens means is moved in the focusing directions, which is substantially parallel to the optical axis directions of said objective lens means, in accordance with said focusing control signal so as to perform a focus servo; and tracking error detecting means responsive to a light beam reflected from said recording medium so as to obtain a tracking error signal which is in turn supplied as said tracking control signal to said actuator means so that said objective lens means is moved in the tracking directions, which is substantially perpendicular to the optical axis directions of said objective lens means, in accordance with said tracking control signal so as to perform a tracking servo, said tracking error detecting means including: photodetector means having a light-detecting region on which a light spot with a predetermined diameter is formed by the reflected light beam from said recording medium and which is divided by a division line, which is provided in correspondance with said information track on said recording medium, into first and second light-detecting subregions, said division line comprising first to third portions so that said second and third portions are disposed to be symmetrical with respect to said first division line and one end of said second portion is connected to one end of said first portion and the other end of said first portion is connected to one end of said third portion so as to form a S-like configuration, said first and second light-detecting subregions being arranged so that their light receiving quantities are equal to each other when said objective lens means enters into the focus servo state and is at a neutral position in its movable range under the tracking servo; and differential amplifier means responsive to electric signals produced by said first and second light-detecting subregions for calculating a difference between the electric signals due to said first and second light-detecting subregions, said differential amplifier means supplying said actuator means with the difference signal as said tracking control signal so that said objective lens means is moved in the tracking directions in accordance with said difference signal.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
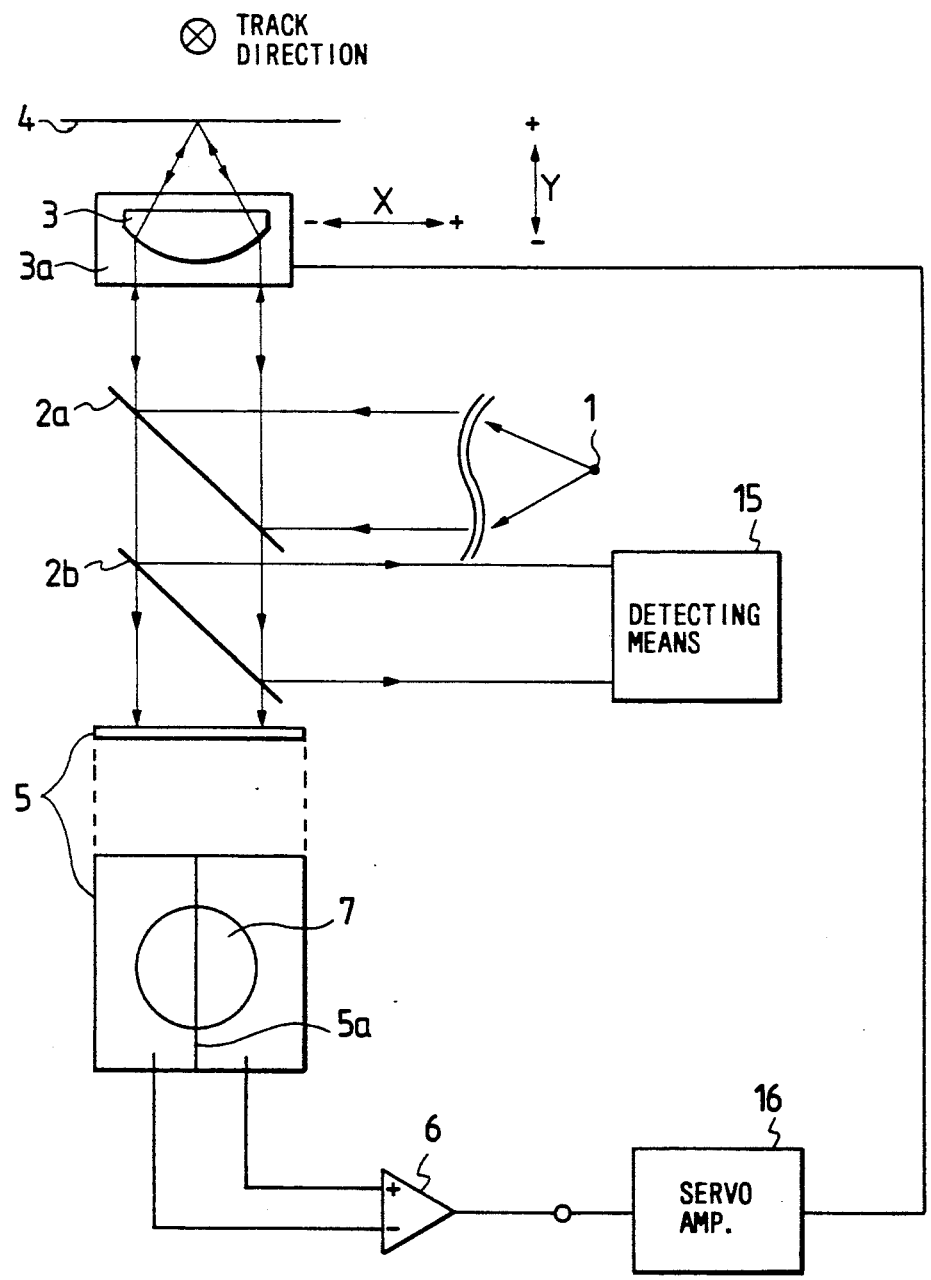
FIG. 1 is an illustration of a conventional optical head with a tracking error detecting system.
Figure 3:
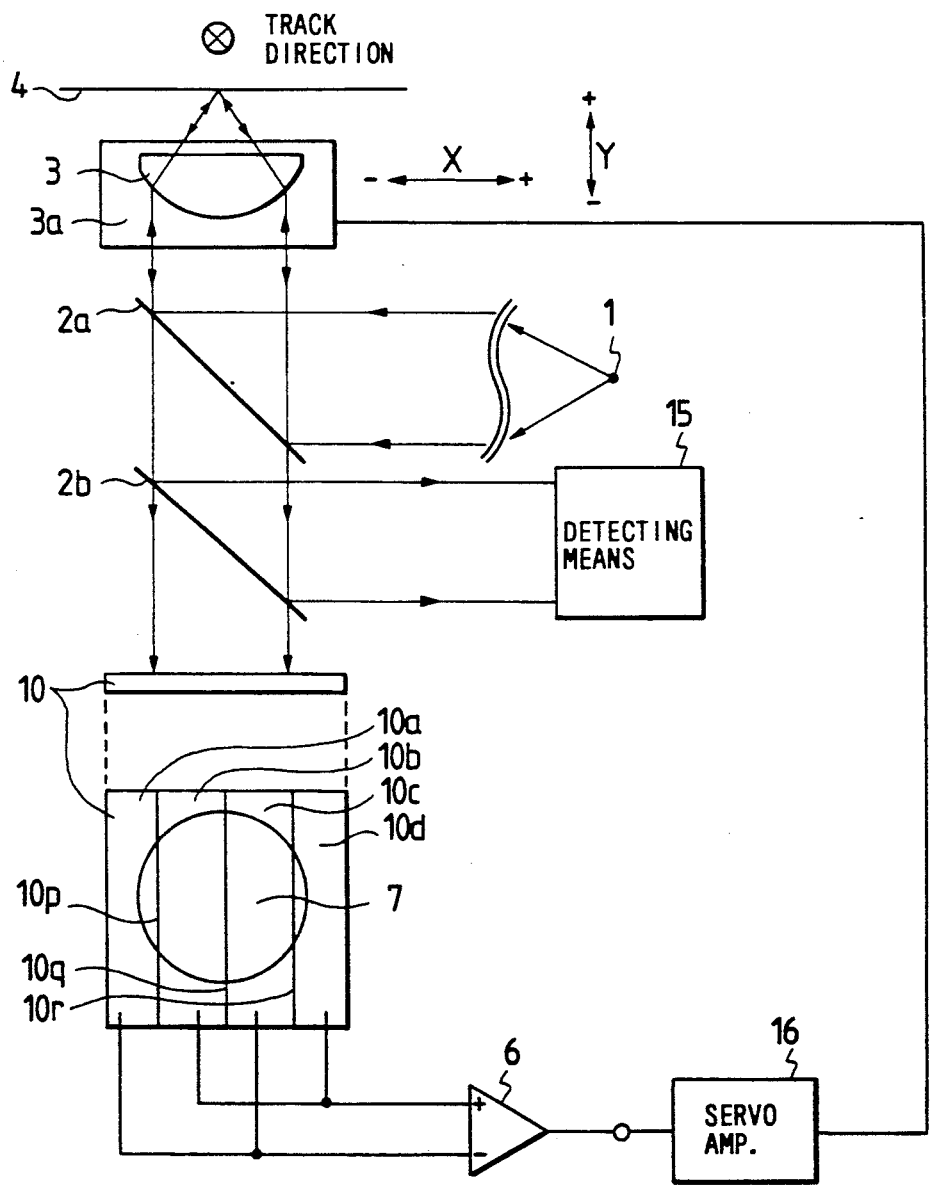
FIG. 3 is an illustration of an arrangement of an optical head with a tracking error detecting system according to a first embodiment of the present invention.

Referring now to FIG. 3, there is schematically illustrated an optical head with an tracking error detecting system according to an embodiment of the present invention, where parts corresponding to those in FIG. 1 are marked with the same numerals and characters. In FIG. 3, illustrated at numeral 1 is a light source which emits a light beam, which is directed to a half-mirror 2a so as to be reflected thereon. The reflected light beam reaches an objective lens 3 to be converged so as to form a microscopic light spot on a disc 4 having a continuously recorded track, not shown, whose width is about 0.8 μm, depth is about 70 nm and pitch is about 1.6 μm, for example. A reflected light beam from the disc 4 returns along the same optical path to pass through the half-mirror 2a and then reach another half-mirror 2b. At the half-mirror 2b, a portion of the reflected light beam is again reflected so as to be directed to a known detecting means 15 for focus error signal detection and information signal detection, whereby the objective lens 3 is moved in the positive (+) or negative (−) direction indicated by an arrow Y to perform the focus servo. On the other hand, the other portion of the reflected light beam passes through the half-mirror 2b to reach a photodetector 10 to form a light spot 7 thereon.

The photodetector 10 has thereon three division lines 10p, 10q and 10r which are arranged to be substantially parallel to the recorded track formed on the disc 4 so as to divide the light-detecting region into four light-detecting subregions 10a to 10d. Here, in cases where the objective lens 3 takes the neutral position in directions indicated by an arrow X, the light spot 7 is formed on the photodetector 10 so as to be symmetrical with respect to the division line (central division line) 10q. Due to the focus servo against the disc 4, when the objective lens 3 takes the neutral position, the receiving light quantity of the light-detecting subregion 10b is substantially equal to that of the light-detecting subregion 10c and the receiving light quantity of the light-detecting subregion 10a is substantially equal to that of the light-detecting subregion 10d.

The electric signal due to the light-receiving subregion 10b is added to the electric signal due to the light-detecting subregion 10d and the sum signal is fed to a differential amplifier 6. On the other hand, the electric signal due to the light-detecting subregion 10a is similarly added to the electric signal due to the light-detecting subregion 10c and the sum signal is supplied to the same differential amplifier 6. The differential amplifier 6 calculates the difference between both the sum signals in order to obtain a tracking error signal on the basis of the light quantity distribution due to the diffraction on the recording track of the disc 4 as well as the Push-pull method. The obtained tracking error signal is fed to a servo amplifier 16 whereby the objective lens 3 is moved in the positive (+) or negative (−) direction X by means of an actuator 3a for the tracking servo operation.

Figure 2A:
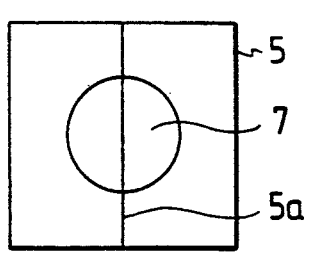
FIGS. 2A, 2B and 2C are illustrations for describing the operation of the FIG. 1 conventional optical head.
Figure 2A:
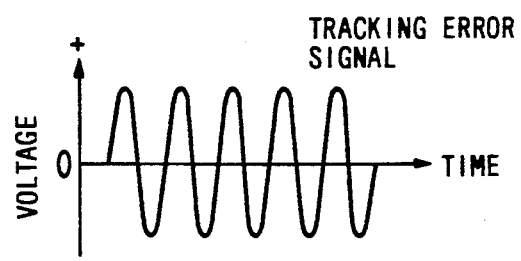
Figure 2B:
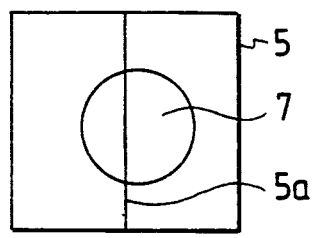
Figure 2B:
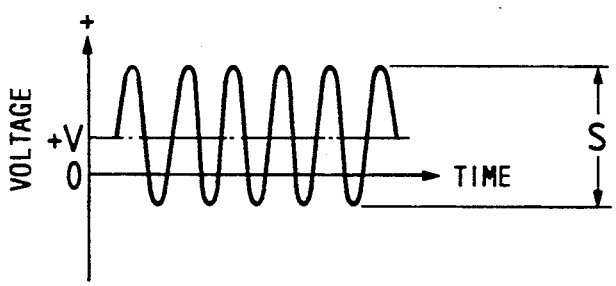
Figure 2C:
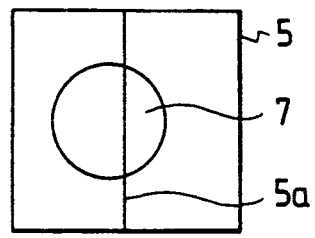
Figure 2C:
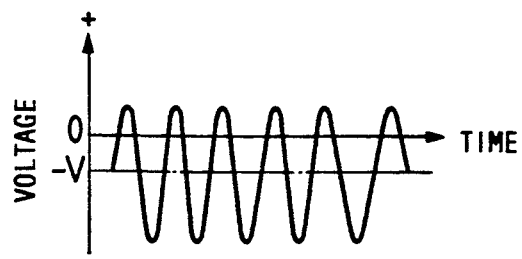
Figure 4A:
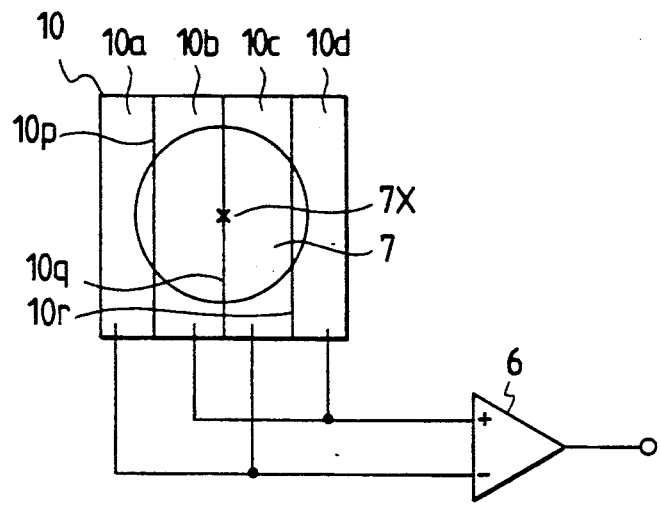
FIGS. 4A to 5B are illustrations for describing the FIG. 3 optical head.
Figure 4B:
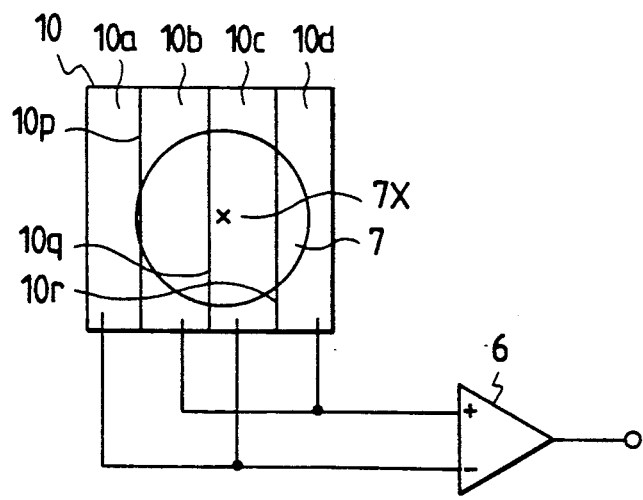

FIGS. 4A and 4B are illustrations of the light spot 7 relative to the photodetector 10 where 7x represents the central position of the light spot 7. In FIG. 4A showing the case that the objective lens 3 is at the neutral position in the directions X, the central position 7x of the light spot 7 is on the division line 10q. In this case, the tracking error signal which is the output signal of the differential amplifier 6 does not include an offset. On the other hand, FIG. 4B illustrates the position of the light spot 7 on the photodetector 10 in the case that the objective lens 3 is moved in the positive direction X. In this case, the central position 7x of the light spot 7 is shifted to be in the light-detecting subregion 10c. Therefore, the light receiving quantities by the light-detecting subregions 10c and 10d are respectively increased, while the light receiving quantities by the light-detecting subregions 10a and 10b are respectively decreased. Here, if the distance between the division lines 10p and 10r is adequately determined, the increased and decreased amounts of the light receiving quanities by the respective light-detecting subregions 10a to 10d can become substantially equal to each other. Thus, unlike the case illustrated in FIG. 2B, the possible offset can be extremely reduced in the tracking error signal obtained by taking the difference between the sum signal of the electric signals due to the light-detecting subregions 10b and 10d and the sum signal of the electric signals due to the light-detecting subregions 10a and 10c. Even if the objective lens 3 is moved in the negative direction X, it is similarly possible to obtain the tracking error signal in which the offset can be lessened.

Figure 5A:
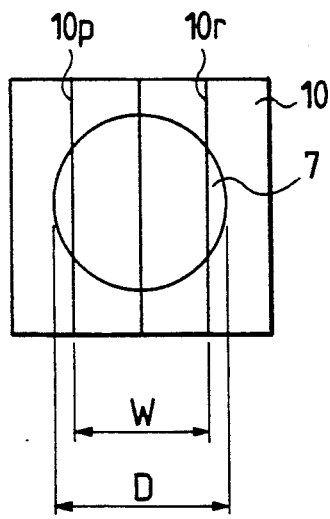
Figure 5B:
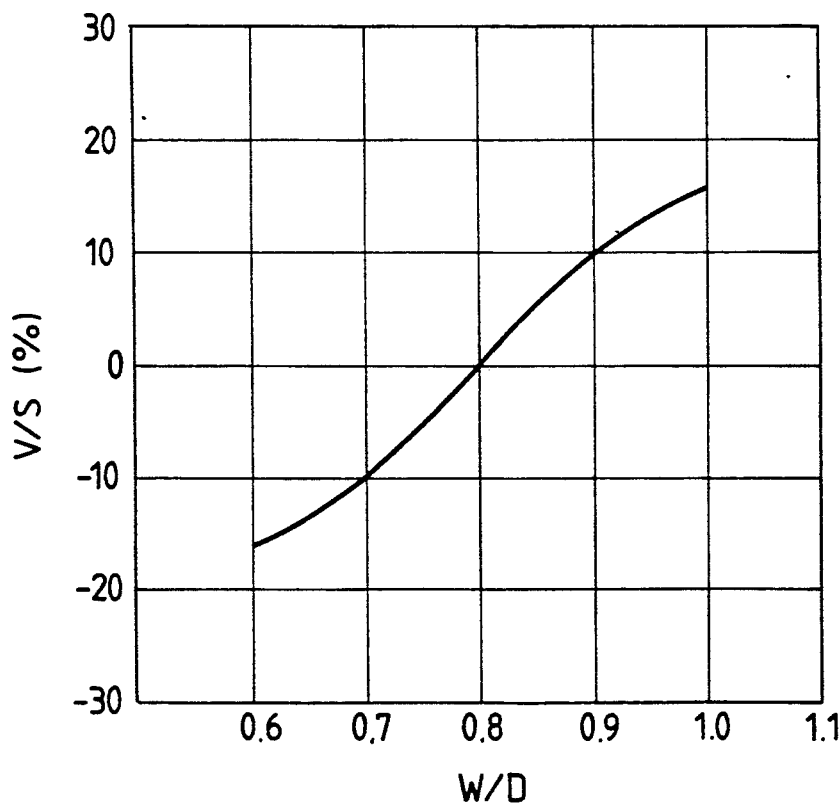

FIGS. 5A and 5B are illustrations for describing the affection to the offset in conjunction with the distance or separation between the division lines 10p and 10r and the diameter of the light spot 7 on the photodetector 10. As illustrated in FIG. 5A, the separation between the division lines 10p and 10r is taken to be W and the diameter of the light spot 7 is taken as D. FIG. 5B shows the relation between V/S and W/D where S denotes the twice the amplitude of the tracking error signal and V designates the offset voltage of the tracking error signal. Here, the calculation is made under the conditions that the light source 1 emits a coherent light beam with a wavelength of 780 nm, the groove width of the recorded track on the disc 4 is 0.7 μm, the groove pitch is 1.6 μm, the optical groove depth is ⅛ the wavelength, and the moving amount x of the objective lens 3 from the neutral position in the direction X is 300 μm. According to FIG. 5B, when W/D is 0.8, V/S becomes about zero, and if W/D is set to be between 0.7 and 0.9, V/S can be kept to be in the range of ±10%. If V/S become greater than 10%, the tracking servo control performance would be deteriorated. In the case of the above-described push-pull method, V/S exceeds 10% when x is about 50 μm. On the other hand, according to this embodiment, if W/D is set to be between 0.7 and 0.9, x can be enhanced up to six times, i.e., 300 μm, that is, the control range of the objective lens 3 can considerably be enlarged. Thus, it is possible to stably perform the tracking servo operation.

Figure 6:
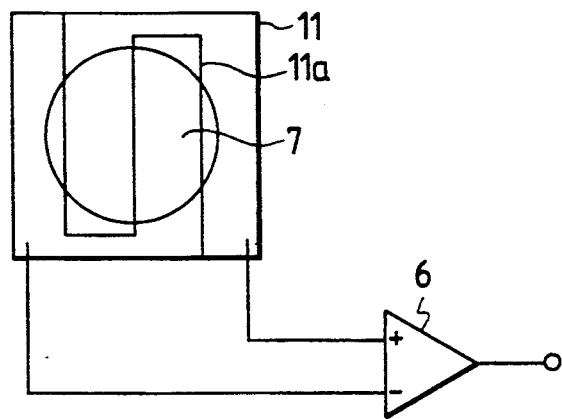
FIGS. 6 to 8 are illustration for describing tracking error detecting systems of optical heads according to second to fourth embodiments of this invention.

A description will be made hereinbelow in terms of second to fourth embodiments with reference to FIGS. 6 to 8. The second to fourth embodiments are based on the same principle as the first embodiment. FIG. 6 shows only a photodetector 11 and a differential amplifier 6 in the second embodiment because the other parts have the same arrangements as those in the FIG. 3 first embodiment. In FIG. 6, the photodetector 11 has thereon a division line 11a having a S-shaped pattern, which may be formed by connecting one end of the division line 10p illustrated in FIG. 3 with one end of the division line 10q in the same drawing and further connecting the other end of the division line 10q with one end of the division line 10r. The division line 11a divides the light-detecting region of the photodetector 11 into two light-detecting subregions. The electric signals due to the two light-detecting subregions are respectively supplied to the differential amplifier 6 to calculate the difference between the two electric signals so as to obtain a tracking error signal. As well as the tracking error detecting system as illustrated in FIG. 3, this second embodiment tracking error detecting system can obtain the tracking error signal in which the offset can considerably be lowered. In addition, this system is simplified as compared with the FIG. 3 system.

Figure 7:
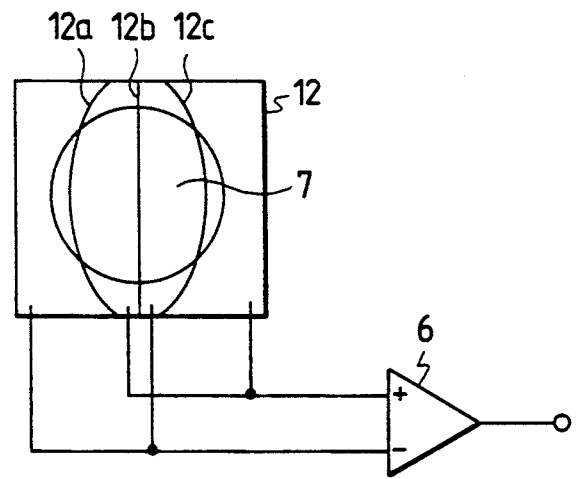

FIG. 7 partially shows a tracking error detecting system according to the third embodiment of this invention. In FIG. 7, a photodetector 12 has thereon three division lines 12a to 12c. Of these division lines 12a to 12c, the division line 12b is linearly formed on the photodetector 12, and the other division lines 12a and 12c are curved toward the outsides so as to become quadratic curves (second order curves) and provided to be symmetrical with respect to the division line 12b. According to this embodiment, in addition to obtain a low-offset tracking error signal, it is possible to more effectively show the receiving light quantity variation due to the movement of the light spot 7 in connection with the movement of the objective lens 3 in the directions X. Here, it is also appropriate that the division lines 12a and 12c are formed to have an arc configuration.

Figure 8:
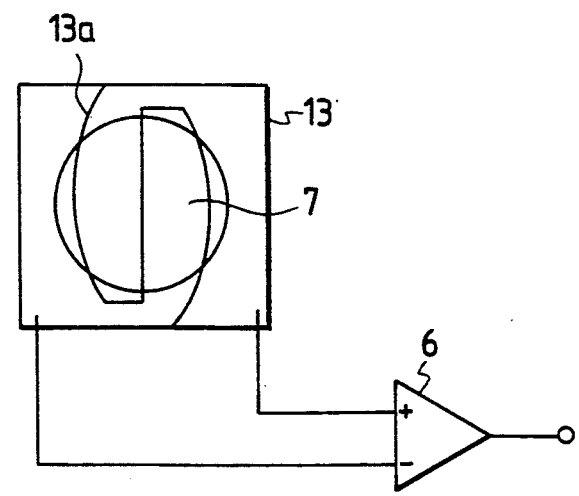

FIG. 8 illustrates the fourth embodiment. In FIG. 8, a photodetector 13 has thereon a division line 13a having an S-shaped configuration, which may be formed by, in FIG. 7, connecting one end of the division line 12a with one end of the division line 12b and further connecting the other end of the division line 12b with one end of the division line 12c. The division line 13a divides the light-detecting region of the photodetector 13 into two light-detecting subregions. The electric signals due to the two light-detecting subregions are respectively supplied to a differential amplifier 6 so as to calculate the difference between the two electric signals. According to this embodiment, it is similarly possible to obtain a tracking error signal in which the offset is extremely lowered.

As described above, according to the first to fourth embodiments of this invention, the tracking error detecting system can be made with a simple arrangement for extremely decreasing the offset of the tracking error signal. Thus, even if the objective lens is moved from the neutral position by the acceleration or the like due to a high-speed movement of the optical head, the tracking servo sufficiently enters into the operating state. In addition, even if the track on the disc is eccentrically shifted by more than 100 μm (for example), the follow-up for the track is extremely improved so as to realize a stable tracking servo operation.

It should be understood that the foregoing relates to preferred embodiments of the present invention, and that it is intended to cover all changes and modifications of the embodiments of this invention herein used for the purposes of the disclosure, which do not constitute departures from the spirit and scope of the invention. For example, although in the embodiments the light beam to be incident on the photodetector is a parallel light beam, it is also appropriate to provide a beam-converging means such as a convexed lens between the half-mirror (2b) and the photodetector. Further, although for execution of the tracking servo the objective lens is moved in the directions X, it is also appropriate to move the light spot in the tracking directions by means of an adequate means such as a galvano mirror.

What is claimed is:

1. An optical head for optically reproducing information from a recording medium, said optical head comprising:

light source means for emitting a light beam;

objective lens means for converging the light beam from said light source means so as to apply a microscopic light spot to an information track formed on said recording medium;

actuator means for moving said objective lens means in predetermined focusing and tracking directions in accordance with focusing and tracking control signals;

focus error signal detecting means responsive to a light beam reflected from said recording medium so as to obtain a focus error signal which is in turn supplied as said focusing control signal to said actuator means so that said objective lens means is moved in the focusing directions, which is substantially parallel to an optical axis direction of said objective lens means, in accordance with said focusing control signal so as to perform a focus servo; and tracking error detecting means responsive to a light beam reflected from said recording medium so as to obtain a tracking error signal which is in turn supplied as said tracking control signal to said actuator means so that said objective lens means is moved in the tracking directions, which is substantially perpendicular to the optical axis direction of said objective lens means, in accordance with said tracking control signal so as to perform a tracking servo, said tracking error detecting means including:

photodetector means having a light-detecting region on which a light spot with a predetermined diameter is formed by the reflected light beam from said recording medium and which is divided by a first division line, which is provided in correspondence with said information track on said recording medium, into two which are respectively divided by second and third division lines, substantially parallel to said first division line, so as to form first to fourth light-detecting subregions, said first and second light-detecting subregions being adjacent to each other with said first division line being interposed therebetween, and said third light-detecting subregion being adjacent to said first light-detecting subregion with said second division line being interposed therebetween and said fourth light-detecting subregion being adjacent to said second light-detecting subregion with said third division line being interposed therebetween, said first and second light-detecting subregions being arranged so that their light receiving quantities are equal to each other when said objective lens means enters into the focus servo state and is at a neutral position in its movable range under the tracking servo, and a separation between said second and third division lines being determined so that the sum of the light receiving quantities of said first and fourth light-detecting subregions is substantially equal to the sum of the light receiving quantities of said second and third light-detecting subregions when said objective lens means is shifted from the neutral position; and differential amplifier means responsive to electric signal produced by said first to fourth light-detecting subregions for calculating a difference between a sum signal of the electric signals due to said first and fourth light-detecting subregions and a sum signal of the electric signals due to said second and third light-detecting subregions, said differential amplifier means supplying said actuator means with a difference signal representing the calculated difference as said tracking control signal so that said objective lens means is moved in the tracking directions in accordance with said difference signal, wherein said photodetector means is arranged such that, when the diameter of the light spot formed thereon is D and the separation between said second and third division lines is W, W/D is between 0.7 and 0.9.

2. An optical head for optically reproducing information from a recording medium, said optical head comprising:

light source means for emitting a light beam;

objective lens means for converging the light beam from said light source means so as to apply a microscopic light spot to an information track formed on said recording medium;

actuator means for moving said objective lens means in predetermined focusing and tracking directions in accordance with focusing and tracking control signals;

focus error signal detecting means responsive to a light beam reflected from said recording medium so as to obtain a focus error signal which is in turn supplied as said focusing control signal to said actuator means so that said objective lens means is moved in the focusing directions, which is substantially parallel to an optical axis direction of said objective lens means, in accordance with said focusing control signal so as to perform a focus servo; and tracking error detecting means responsive to a light beam reflected from said recording medium so as to obtain a tracking error signal which is in turn supplied as said tracking control signal to said actuator means so that said objective lens means is moved in the tracking directions, which is substantially perpendicular to the optical axis direction of said objective lens means, in accordance with said tracking control signal so as to perform a tracking servo, said tracking error detecting means including:

photodetector means having a light-detecting region on which a light spot with a predetermined diameter is formed by the reflected light beam from said recording medium and which is divided by a first division line, which is provided in correspondence with said information track on said recording medium, into two which are respectively divided by second and third division lines, substantially parallel to said first division line, so as to form first to fourth light-detecting subregions, said first and second light-detecting subregions being adjacent to each other with said first division line being interposed therebetween, and said third light-detecting subregion being adjacent to said first light-detecting subregion with said second division line being interposed therebetween and said fourth light-detecting subregion being adjacent to said second light-detecting subregion with said third division line being interposed therebetween, said first and second light-detecting subregions being arranged so that their light receiving quantities are equal to each other when said objective lens means enters into the focus servo state and is at a neutral position in its movable range under the tracking servo, and a separation between said second and third division lines being determined so that the sum of the light receiving quantities of said first and fourth light-detecting subregions is substantially equal to the sum of the light receiving quantities of said second and third light-detecting subregions when said objective lens means is shifted from the neutral position; and differential amplifier means responsive to electric signal produced by said first to fourth light-detecting subregions for calculating a difference between a sum signal of the electric signals due to said first and fourth light-detecting subregions and a sum signal of the electric signals due to said second and third light-detecting subregions, said differential amplifier means supplying said actuator means with a difference signal representing the calculated difference as said tracking control signal so that said objective lens means is moved in the tracking directions in accordance with said difference signal, wherein said second and third division lines are second order curves which are disposed to be symmetrical with respect to said first division line and whose extensions respectively intersect an extension of said first division line.

3. An optical head for optically reproducing information from a recording medium, said optical head comprising:

light source means for emitting a light beam;

objective lens means for converging the light beam from said light source means so as to apply a microscopic light spot to an information track formed on said recording medium;

actuator means for moving said objective lens means in predetermined focusing and tracking directions in accordance with focusing and tracking control signals;

focus error signal detecting means responsive to a light beam reflected from said recording medium so as to obtain a focus error signal which is in turn supplied as said focusing control signal to said actuator means so that said objective lens means is moved in the focusing directions, which is substantially parallel to an optical axis direction of said objective lens means, in accordance with said focusing control signal so as to perform a focus servo; and tracking error detecting means responsive to a light beam reflected from said recording medium so as to obtain a tracking error signal which is in turn supplied as said tracking control signal to said actuator means so that said objective lens means is moved in the tracking directions, which is substantially perpendicular to the optical axis direction of said objective lens means, in accordance with said tracking control signal so as to perform a tracking servo, said tracking error detecting means including:

photodetector means having a light-detecting region on which a light spot with a predetermined diameter is formed by the reflected light beam from said recording medium and which is divided by an S-shaped division line, which is provided in correspondence with said information track on said recording medium, into first and second light-detecting subregions, said division line comprising first to third portions so that said second and third portions are disposed to be symmetrical with respect to said first portion of said division line and one end of said second portion is connected to one end of said first portion and the other end of said first portion is connected to one end of said third portion so as to form an S-like configuration, said first and second light-detecting subregions being arranged so that their light-receiving quantities are equal to each other when said objective lens means enters into the focus servo state and is at a neutral position in its movable range under the tracking servo; and differential amplifier means responsive to electric signals produced by said first and second light-detecting subregions for calculating a difference between the electric signals due to said first and second light-detecting subregions, said differential amplifier means supplying said actuator means with a difference signal representing the calculated difference as said tracking control signal so that said objective lens means is moved in the tracking directions in accordance with said difference signal.

4. An optical head as claimed in claim 3, wherein said tracking error detecting means includes an optical device whereby the reflected light beam from said recording medium is converged so that a light spot with the predetermined diameter is formed on said light-detecting region of said photodetector.

* * * * *